US010708518B2

(12) United States Patent
Funamizu (10) Patent No.: US 10,708,518 B2
(45) Date of Patent: *Jul. 7, 2020

(54) IMAGING UNIT, IMAGING APPARATUS, AND COMPUTER-READABLE MEDIUM HAVING STORED THEREON A CONTROL PROGRAM FOR SELECTIVELY USING FIRST AND SECOND AMPLIFIED SIGNALS

(71) Applicant: NIKON CORPORATION, Tokyo (JP)

(72) Inventor: Wataru Funamizu, Yokohama (JP)

(73) Assignee: NIKON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/540,496

(22) Filed: Aug. 14, 2019

(65) Prior Publication Data

US 2019/0373181 A1    Dec. 5, 2019

Related U.S. Application Data

(63) Continuation of application No. 14/468,081, filed on Aug. 25, 2014, now Pat. No. 10,469,765, which is a
(Continued)

(30) Foreign Application Priority Data

Feb. 24, 2012  (JP) .................. 2012-038756

(51) Int. Cl.
*H04N 5/243* (2006.01)
*H04N 5/378* (2011.01)
(Continued)

(52) U.S. Cl.
CPC ............. *H04N 5/243* (2013.01); *H04N 5/355* (2013.01); *H04N 5/3575* (2013.01); *H04N 5/374* (2013.01); *H04N 5/378* (2013.01)

(58) Field of Classification Search
CPC .......... H04N 5/243; H04N 5/374; H04N 5/378
See application file for complete search history.

(56) References Cited

U.S. PATENT DOCUMENTS 9,648,266 B2 * 5/2017 Yamasaki .......... H04N 5/37452
2004/0080637 A1 * 4/2004 Nakamura ............. H04N 5/243
348/255
(Continued)

FOREIGN PATENT DOCUMENTS

CN              1477860 A      2/2004
CN           101110913 A       1/2008
(Continued)

OTHER PUBLICATIONS

Oct. 7, 2015 Extended European Search Report issued in European Patent Application No. 13751745.4.
(Continued)

*Primary Examiner* — Antoinette T Spinks
(74) *Attorney, Agent, or Firm* — Oliff PLC (57) ABSTRACT

There is a demand for increasing the dynamic range of an imaging unit. Provided is an imaging unit comprising a pixel section that outputs a pixel signal corresponding to a reset potential after a reset and a signal potential after charge accumulation; an amplifying section that amplifies the pixel signal with a first amplification ratio or a second amplification ratio that is different from the first amplification ratio; and a control section that causes the amplifying section to amplify the pixel signal corresponding to a change from the reset potential to the signal potential with the first amplification ratio, and then causes the amplifying section to amplify the pixel signal corresponding to a change from the signal potential to the reset potential with the second amplification ratio.

9 Claims, 7 Drawing Sheets

Related U.S. Application Data continuation of application No. PCT/JP2013/001055, filed on Feb. 25, 2013.

(51) Int. Cl.
*H04N 5/355* (2011.01)
*H04N 5/357* (2011.01)
*H04N 5/374* (2011.01)

(56) References Cited

U.S. PATENT DOCUMENTS

| | | | | |
|---|---|---|---|---|
| 2005/0140822 A1* | 6/2005 | Ichikawa | ............. | H04N 5/2351 348/370 |
| 2007/0158533 A1 | 7/2007 | Bamji et al. | | |
| 2008/0018760 A1* | 1/2008 | Nakajima | ............... | H04N 5/365 348/296 |
| 2008/0111893 A1* | 5/2008 | Hattori | ................... | H04N 1/407 348/222.1 |
| 2008/0231736 A1* | 9/2008 | Solhusvik | ............ | H04N 5/3532 348/294 |
| 2009/0051801 A1* | 2/2009 | Mishina | ................ | H04N 5/3742 348/311 |
| 2009/0244329 A1* | 10/2009 | Kuniba | .................... | G06T 5/009 348/241 |
| 2009/0284545 A1* | 11/2009 | Watanabe | ............. | G09G 3/3406 345/589 |
| 2009/0310005 A1* | 12/2009 | Kondo | ................. | H04N 5/3575 348/308 |
| 2011/0186714 A1* | 8/2011 | Hung | ........................ | G01J 1/44 250/214 AL |
| 2012/0026370 A1* | 2/2012 | Oike | .................... | H04N 5/2176 348/298 |
| 2015/0049228 A1* | 2/2015 | Funamizu | .............. | H04N 5/243 348/301 |
| 2015/0326809 A1* | 11/2015 | Yamasaki | .......... | H04N 5/37452 348/300 |

FOREIGN PATENT DOCUMENTS

| | | |
|---|---|---|
| EP | 1 881 696 A2 | 1/2008 |
| JP | 2004-015701 A | 1/2004 |

OTHER PUBLICATIONS

Dec. 28, 2016 Office Action issued in Chinese Patent Application No. 201380021039.5.
May 16, 2017 Office Action issued in European Patent Application No. 13 751 745.4.
Sep. 4, 2017 Office Action issued in Chinese Patent Application No. 201380021039.5.
Feb. 23, 2018 Office Action issued in Chinese Patent Application No. 201380021039.5.
Mar. 6, 2018 Office Action issued in European Patent Application No. 13751745.4.
Mar. 25, 2019 Office Action issued in Indian Patent Application No. 7739/DELNP/2014.
International Search Report issued in PCT/JP2013/001055 dated Mar. 26, 2013.
International Preliminary Report on Patentability issued in PCT/JP2013/0001055 dated Sep. 4, 2014.
Nov. 19, 2015 Office Action issued in U.S. Appl. No. 14/468,081.
May 10, 2016 Office Action issued in U.S. Appl. No. 14/468,081.
Nov. 25, 2016 Office Action issued in U.S. Appl. No. 14/468,081.
Jul. 27, 2017 Office Action issued in U.S. Appl. No. 14/468,081.
Feb. 8, 2018 Office Action issued in U.S. Appl. No. 14/468,081.
Nov. 1, 2018 Office Action issued in U.S. Appl. No. 14/468,081.
May 8, 2019 Notice of Allowance issued in U.S. Appl. No. 14/468,081.
Jun. 12, 2019 Corrected Notice of Allowability issued in U.S. Appl. No. 14/468,081.
Mar. 26, 2020 Office Action issued in Chinese Patent Application No. 201810889918.4.

\* cited by examiner

IMAGING UNIT, IMAGING APPARATUS, AND COMPUTER-READABLE MEDIUM HAVING STORED THEREON A CONTROL PROGRAM FOR SELECTIVELY USING FIRST AND SECOND AMPLIFIED SIGNALS

CROSS-REFERENCE TO RELATED APPLICATION(S)

This application is a continuation of U.S. application Ser. No. 14/468,081 filed Aug. 25, 2014, which is a continuation of International Patent Application No. PCT/JP2013/001055 filed on Feb. 25, 2013, which is based on and claims priority under 35 U.S.C. 119 from Japanese Patent Application No. 2012-038756 filed on Feb. 24, 2012. The contents of the above applications are incorporated herein by reference in their entirety.

BACKGROUND

1. Technical Field

The present invention relates to an imaging unit, an imaging apparatus, and a control program.

2. Related Art

A CMOS type imaging unit is known that amplifies and retrieves a pixel signal generated by a pixel section in response to incident light, using an amplification circuit provided for each vertical signal line, as shown in Patent Document 1, for example. Patent Document 1: 2004-15701

A charge corresponding to the incident light is accumulated by a floating diffusion, output to the vertical signal line, and amplified by the amplification circuit, and the resulting circuit is retrieved. After the charge is retrieved from the floating diffusion, the floating diffusion is reset, and therefore there is a limit of one type of amplification factor of the amplification circuit each time light is incident. When the amplification factor is reduced to accommodate intense incident light that causes a large charge to he accumulated in the floating diffusion, the signal retrieved from a region where the incident light is weak also becomes weak. Inversely, when the amplification factor is increased to accommodate weak incident light, the signal retrieved from a region where the incident light is intense becomes saturated. Therefore, a wider dynamic range is desired, without exceeding the dynamic range of the imaging unit.

SUMMARY

According to a first aspect of the present invention, provided is an imaging unit comprising a pixel section that outputs a pixel signal corresponding to a reset potential after a reset and a signal potential after charge accumulation; an amplifying section that amplifies the pixel signal with a first amplification ratio or a second amplification ratio that is different from the first amplification ratio; and a control section that causes the amplifying section to amplify the pixel signal corresponding to a change from the reset potential to the signal potential with the first amplification ratio, and then causes the amplifying section to amplify the pixel signal corresponding to a change from the signal potential to the reset potential with the second amplification ratio.

According to a second aspect of the present invention, provided is a control program for controlling an imaging unit that includes a photoelectric converter, a transfer gate that transfers charge generated by the photoelectric converter to a floating diffusion, a pixel reset switch that eliminates the charge accumulated in the floating diffusion and resets a potential of the floating diffusion from a signal potential to a reset potential, and an amplifying section that amplifies a pixel signal output based on the potential of the floating diffusion. The control program, when executed, causes a computer to set the potential of the floating diffusion to the reset potential by turning OFF the transfer gate and turning ON the reset switch; set the potential of the floating diffusion to the signal potential by turning OFF the reset switch, turning ON the transfer gate for a predetermined time, and then turning OFF the transfer gate, thereby causing a first pixel signal, which is the pixel signal corresponding to a change from the reset potential to the signal potential, to be output; cause the amplifying section to amplify the first pixel signal with a first amplification ratio; set the potential of the floating diffusion to the reset potential by again turning ON the reset switch, thereby causing a second pixel signal, which is the pixel signal corresponding to a change from the signal potential to the reset potential, to be output; and cause the amplifying section to amplify the second pixel signal with the second amplification ratio.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
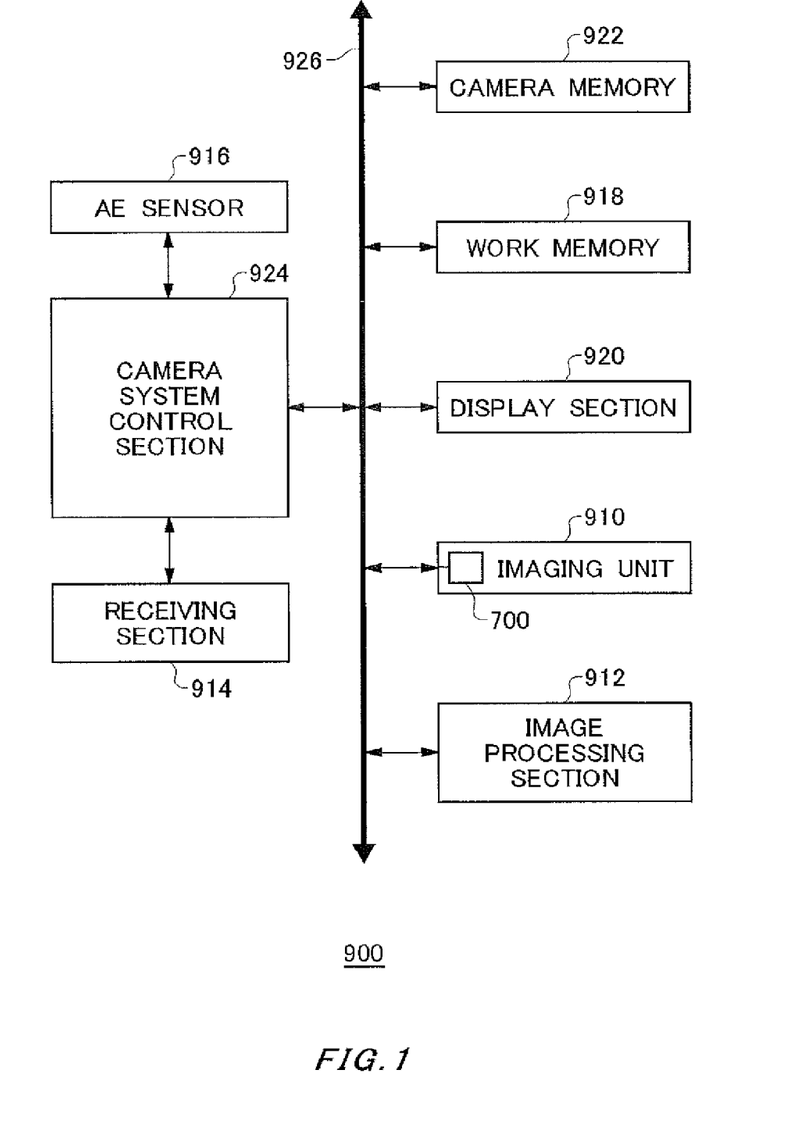
FIG. 1 is a view for describing the configuration of an imaging apparatus according to an embodiment of the present invention.

FIG. 1 is a view for describing the configuration of an imaging apparatus 900 according to an embodiment of the present invention. The imaging apparatus 900 includes an imaging unit 910, an image processing section 912, a work memory 918, a display section 920, a camera memory 922, a bus 926, a camera system control section 924, an AE sensor 916, and a receiving section 914. The imaging unit 910, the image processing section 912, the display section 920, the work memory 918, the camera memory 922, and the camera system control section 924 are connected to the bus 926, and exchange signals with each other through the bus 926.

The imaging unit 910 includes an image sensor, such as a CMOS sensor, in which a plurality of photoelectrical converting elements are arranged two-dimensionally. The imaging unit 910 includes a control section 700. The imaging unit 910 is controlled by the camera system control section 924 to output an amplified signal obtained by amplifying a pixel signal obtained from a subject image. The camera system control section 924 and the control section 700 may function together as the control section of the imaging unit 910.

The image processing section 912 applies various types of image processing with the work memory 918 as a workspace, to generate image data. The generated image data is converted into a display signal by the image processing section 912, and can be displayed in the display section 920. The image data can be recorded in the camera memory 922.

The AE sensor 916 is a photometric sensor with a plurality of photometric regions set for the subject space, and detects the brightness of the subject image at each photometric point. One image capturing sequence is begun by the receiving section 914 receiving a user manipulation and outputting a manipulation signal to the camera system control section 924. The receiving section 914 receives a selection of ISO sensitivity made by the user, and transmits this selection to the camera system control section 924. The camera system control section 924 transmits to the control section 700 an amplification ratio corresponding to the ISO sensitivity received by the receiving section 914.

The various operations such as AF and AE are performed under the control of the camera system control section 924. For example, the camera system control section 924 analyzes the detection signal of the AE sensor 916, and transmits to the control section 700 the amplification ratio of the pixel signal corresponding to the optimal ISO sensitivity.

Figure 2:
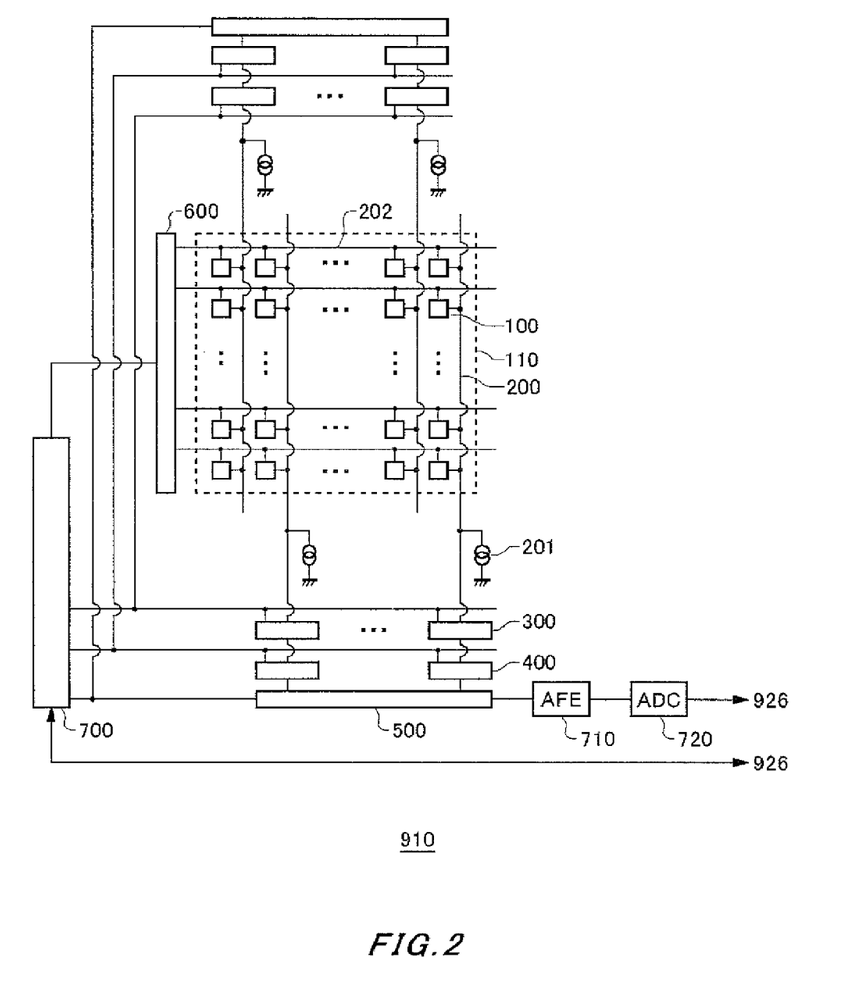
FIG. 2 is a view for describing the configuration of an imaging unit according to an embodiment of the present invention.

FIG. 2 is a diagram for describing a configuration of the imaging unit 910 according to an embodiment of the present invention. The imaging unit 910 includes a pixel section 110, a negative current source 201, a serial amplification amplifier section 300, a charge holding section 400, a retrieval circuit 500, a vertical scanning section 600, a control section 700, an AFE 710, and an ADC 720.

The imaging unit 910 includes a plurality of single pixels 100 in the pixel section 110. The single pixels 100 are arranged in a matrix. Each single pixel 100 is connected to a vertical signal line 200 and a control line 202. The control line 202 is formed by a plurality of signal wires, and may have high signal transmission efficiency. Single pixels 100 arranged in the same column are connected to a shared control line 202. The control line 202 is connected to the vertical scanning section 600. Single pixels 100 arranged in the same row are connected to a shared vertical signal line 200. The retrieval of a pixel signal from a single pixel 100 to the vertical signal line 200 is controlled by the vertical scanning section 600, via the control line 202.

The vertical signal line 200 is connected to the retrieval circuit 500, via the serial amplification amplifier section 300 and the charge holding section 400. The negative current source 201 supplies current to the vertical signal line 200. The serial amplification amplifier section 300 amplifies the pixel signal retrieved from the single pixel 100 and transmits an amplified signal, which is the amplified pixel signal, to the charge holding section 400. The charge holding section 400 holds the amplified signal and transmits the amplified signal to the retrieval circuit 500 at a timing controlled by the control section 700. The retrieval circuit 500 transmits the amplified signal to the AFE 710.

The AFE 710 accumulates the levels of amplified signals and transmits these levels to the ADC 720. The ADC 720 converts the signal received from the AFE 710 into a digital signal, and outputs this digital signal. The AFE 710 and the ADC 720 may be provided on the same substrate as the other configurational elements of the imaging unit 910, but are not limited to this location. Instead, the AFE 710 and the ADC 720 may be provided on a separate substrate, and may be electrically connected to the substrate on which the other configurational elements of the imaging unit 910 are provided, by wires or bumps. The vertical scanning section 600, the serial amplification amplifier section 300, the charge holding section 400, and the retrieval circuit 500 are electrically connected to the control section 700 and controlled by the control section 700.

Figure 3:
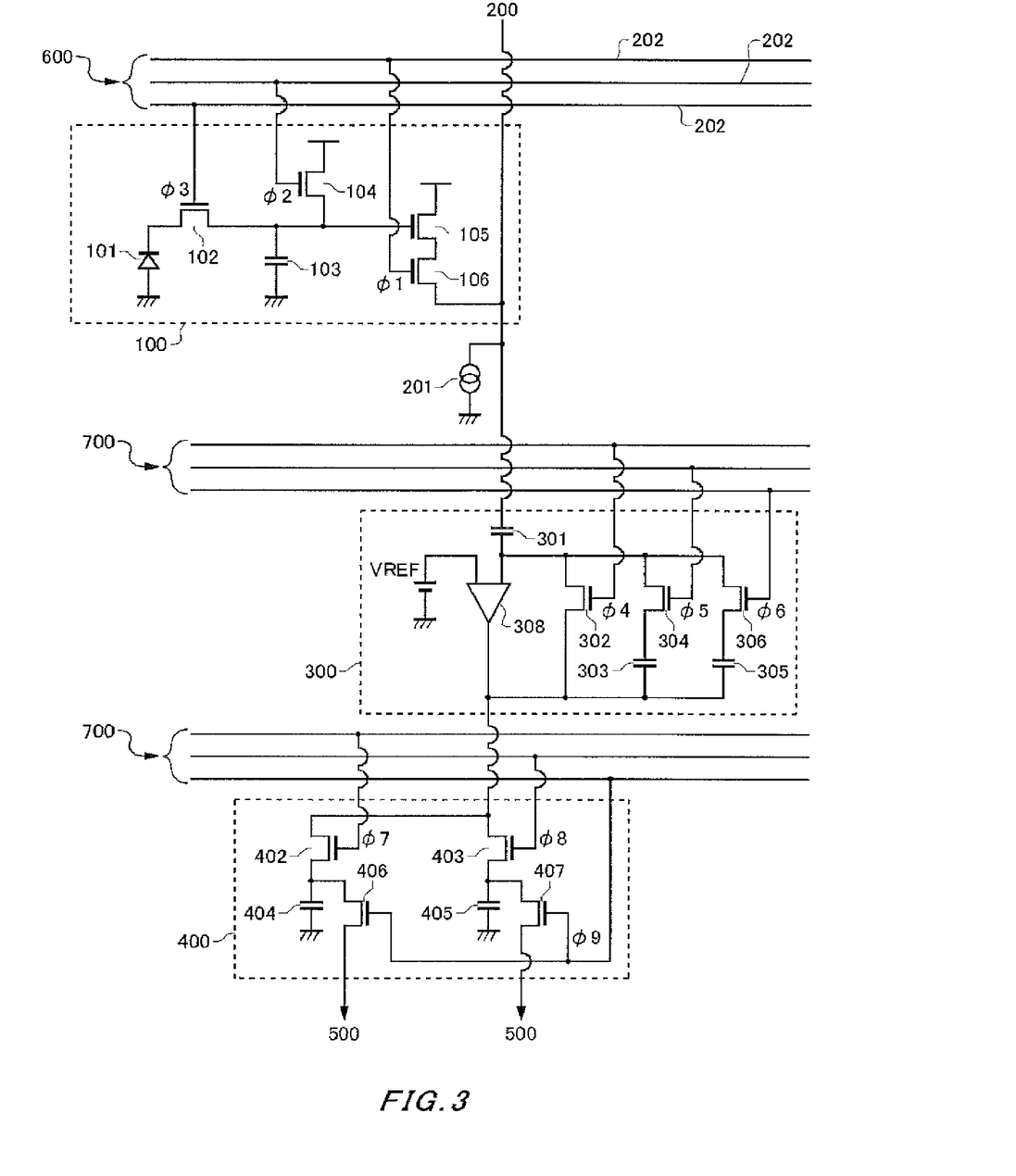
FIG. 3 shows an enlarged portion of the configuration of the imaging unit.

FIG. 3 shows an enlarged portion of the configuration of the imaging unit 910. The single pixel 100 includes a photoelectric convertor 101, a transfer gate 102, a floating diffusion 103, a pixel reset switch 104, a pixel amplifier 105, and a selection switch 106.

The photoelectric converter 101 converts received light into charge and accumulates this charge. The photoelectric converter 101 is a photodiode, for example. The control section 700 causes the transfer gate 102 to transfer the charge generated by the photoelectric converter 101 to the floating diffusion 103. The control section 700 accumulates the charge transferred through the transfer gate 102 in the floating diffusion 103. The control section 700 disperses the charge accumulated in the floating diffusion to the pixel reset switch 104 connected to the floating diffusion 103, to reset the potential of the floating diffusion 103 from a signal potential to a reset potential.

The pixel amplifier 105 is connected to the floating diffusion 103, amplifies the potential of the floating diffusion 103, and outputs the result of the amplification. The selection switch 106 is connected to the pixel amplifier 105 and the vertical signal line 200. The negative current source 201 is connected to the vertical signal line 200.

The serial amplification amplifier section 300 includes an input capacitor 301, a serial amplification assembly switch 302, a first feedback capacitor selection switch 304, a first feedback capacitor 303, a second feedback capacitor selection switch 306, a second feedback capacitor 305, and an amplifier 308. The input capacitor 301 is connected to the vertical signal line 200. The input capacitor 301 is connected to one of the input terminals of the amplifier 308, and VREF is connected to the other input terminal of the amplifier 308 to be a reference potential. The feedback loop of the amplifier 308 includes the serial amplification assembly switch 302, the first feedback capacitor selection switch 304 and first feedback capacitor 303, and the second feedback capacitor selection switch 306 and second feedback capacitor 305 in parallel with each other. The first feedback capacitor selection switch 304 and the first feedback capacitor 303 are connected in series. The second feedback capacitor selection switch 306 and the second feedback capacitor 305 are connected in series.

The charge holding section 400 includes a reset potential input switch 402, a reset potential holding capacitor 404, a signal potential input switch 403, a signal potential holding capacitor 405, a reset potential output switch 406, and a signal potential output switch 407. The reset potential input switch 402 and the signal potential input switch 403 are connected in parallel to the output of the serial amplification amplifier section 300. The reset potential holding capacitor 404 is connected to the reset potential input switch 402. The reset potential output switch 406 is connected to the reset potential holding capacitor 404. The reset potential output switch 406 is connected to the retrieval circuit 500. The signal potential holding capacitor 405 is connected to the signal potential input switch 403. The signal potential output switch 407 is connected to the signal potential holding capacitor 405. The signal potential output switch 407 is connected to the retrieval circuit 500.

Figure 4:
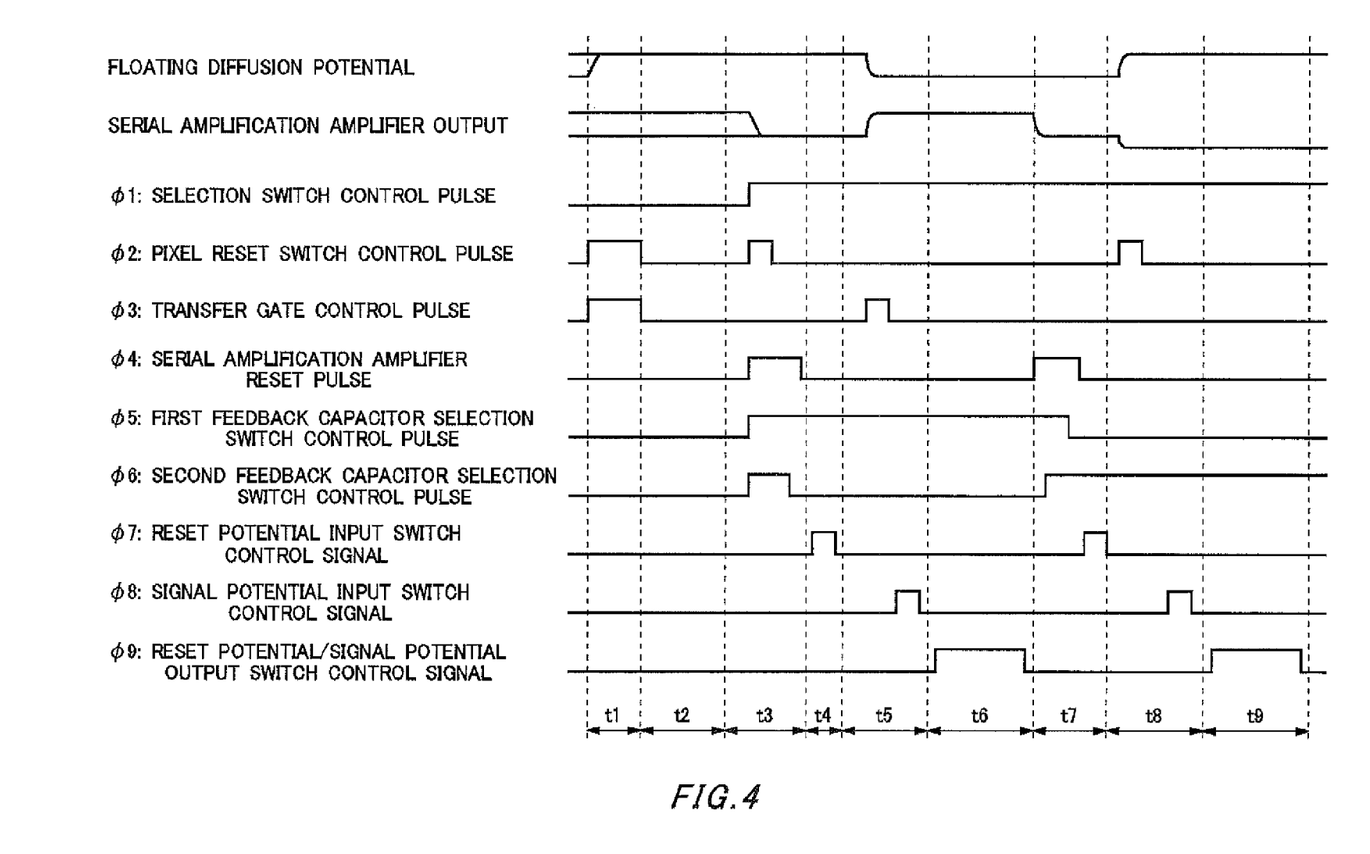
FIG. 4 is a timing chart showing the operational timing of the imaging unit during a first horizontal period.

FIG. 4 is a timing chart showing the operational timing of the imaging unit 910 during a first horizontal period. The operation of the imaging unit 910 shown in FIG. 4 is controlled by the control section 700. During a first period (t1), the pixel reset switch 104 and the transfer gate 102 are turned ON for a prescribed time. In other words, φ1 and φ2 are set to a potential of the ON state. In this way, the potentials of the photoelectric converter 101 and the floating diffusion 103 are reset. At this time, the potentials of all of the photoelectric converters 101 and floating diffusions 103 of the imaging unit 910 may be reset simultaneously.

During a second period (t2), the photoelectric converter 101 converts received light into charge and accumulates this charge. The charge accumulation of the photoelectric converter 101 is determined by the exposure time set for the imaging unit 910 by the camera system control section 924.

During a third period (t3), the selection switch 106 is turned ON. Furthermore, the pixel reset switch 104 is turned ON for a prescribed time. In other words, φ1 is set to the potential of the ON state and φ2 is set to the potential of the ON state for a prescribed time. In this way, the floating diffusion 103 is set to the reset potential after a reset.

In the serial amplification amplifier section 300, during the third period (t3), the serial amplification assembly switch 302 and the second feedback capacitor selection switch 306 are turned ON for a prescribed time. In other words, φ4 and φ6 are set to the potential of the ON state. Furthermore, φ5 is set to the potential of the ON state, and the first feedback capacitor selection switch 304 is turned ON. In this way, the input terminal of the amplifier 308 is reset.

Next, after a prescribed time has passed, φ4 and φ6 are set to the potential of the OFF state, and the serial amplification assembly switch 302 and the second feedback capacitor selection switch 306 are turned OFF. At this time, after the second feedback capacitor selection switch 306 is turned OFF, the serial amplification assembly switch 302 is turned OFF. With φ5 being at the potential of the ON state, the first feedback capacitor selection switch 304 continues in the ON state. Therefore, the amplification ratio of the serial amplification amplifier section 300 is set to a first amplification ratio that is determined according to the ratio between the capacitance of the input capacitor 301 and the capacitance of the first feedback capacitor 303.

During a fourth period (t4), φ7 is set to the potential of the ON state and the reset potential input switch 402 is turned ON, for a prescribed time. In this way, with the potential of the floating diffusion 103 being in the reset state, a potential corresponding to this reset potential is accumulated in the reset potential holding capacitor 404.

During a fifth period (t5), φ3 is set to the potential of the ON state for a prescribed time, and the transfer gate 102 is turned ON for a prescribed time. In this way, the electrons generated by the photoelectric converter 101 during the second period (t2) are transmitted to the floating diffusion 103, and the potential of the floating diffusion 103 changes from the reset potential to the signal potential after accumulating charge. The change in the potential of the floating diffusion 103 is communicated to the vertical signal line 200 via the pixel amplifier 105 and the selection switch 106. As a result, the pixel signal corresponding to the reset potential and the signal potential is output from the single pixel 100 to the vertical signal line 200. The pixel signal corresponding to the change from the reset potential to the signal potential is input to the serial amplification amplifier section 300 from the vertical signal line 200. The pixel signal input to the serial amplification amplifier section 300 is amplified by the first amplification ratio, which is determined by the ratio between the capacitance of the input capacitor 301 and the capacitance of the first feedback capacitor 303. The first amplified signal, which has been amplified by the first amplification ratio, is output to the charge holding section 400 from the serial amplification amplifier section 300.

The potential of the first amplified signal output from the serial amplification amplifier section 300 is expressed as Vout, when Vout expressed by the expression shown below is less than the power supply voltage of the serial amplification amplifier section 300. When Vout is greater than or equal to the power supply voltage of the serial amplification amplifier section 300, the potential of the first amplified signal output from the serial amplification amplifier section 300 is equal to the power supply voltage of the serial amplification amplifier section 300.

$Vout=VREF+$(reset potential of the floating diffusion 103−signal potential of the floating diffusion 103)×gain of the pixel amplifier 105×(−capacitance of the input capacitor 301/capacitance of the first feedback capacitor 303).

As an example, the capacitance of the input capacitor 301 is 1 pF, the capacitance of the first feedback capacitor 303 is 0.1 pF, the reset potential of the floating diffusion 103 is 4 V, the gain of the pixel amplifier 105 is 0.8 times, VREF is 2.0 V, and the power supply voltage of the serial amplification amplifier section 300 is 5 V. After the potential of the floating diffusion 103 becomes the reset potential of 4 V and the transfer gate 102 is turned ON for a predetermined time, the potential becomes the signal potential of 3 V. At this time, Vout=2.0V+(4V−3V)×0.8×(−1 pF/0.1 pF)=10.0 V, which is greater than the 5 V power supply potential of the serial amplification amplifier section 300. Accordingly, in the example described above, the potential of the first amplified signal output from the serial amplification amplifier section 300 is 5 V. In other words, the first amplified signal in this case is a saturated signal.

After the transfer gate 102 is turned OFF, the signal potential input switch 403 is turned ON for a prescribed time. In this way, the signal potential holding capacitor 405 holds the first amplified signal output from the serial amplification amplifier section 300 in response to the incident light.

During a sixth period (t6), φ9 is set to the potential of the ON state, and the reset potential output switch 406 and signal potential output switch 407 are turned ON for a prescribed time. In this way, the signal corresponding to the reset potential held by the reset potential holding capacitor 404 in the fourth period (t4) and the first amplified signal corresponding to the signal potential held by the signal potential holding capacitor 405 in the fifth period (t5) are transmitted to the retrieval circuit 500.

During a seventh period (t7), φ4, φ5, and φ6 are set to the voltage of the ON state, and the serial amplification assembly switch 302, the first feedback capacitor selection switch 304, and the second feedback capacitor selection switch 306 are turned ON. In this way, the input terminal of the amplifier 308 is reset. In other words, the floating diffusion 103 sets the signal potential state as a reference, and the serial amplification amplifier section 300 is reset. In the present example, the first feedback capacitor selection switch 304 remains ON from the third period (t3).

Next, after the first feedback capacitor selection switch 304 is turned OFF, the serial amplification assembly switch 302 is turned OFF. In other words, φ5 is set to the potential of the OFF state, and φ4 is set to the potential of the OFF state. With φ6 being at the ON state potential, the second feedback capacitor selection switch 306 remains in the ON state. As a result, the amplification ratio of the serial amplification amplifier section 300 is set to a second amplification ratio, which is determined according to the ratio between the capacitance of the input capacitor 301 and the capacitance of the second feedback capacitor 305. In this example, the capacitance of the first feedback capacitor selection switch 304 differs from the capacitance of the second feedback capacitor 305, and therefore the second amplification ratio of the serial amplification amplifier section 300 determined in the seventh period (t7) is different from the first amplification ratio of the serial amplification amplifier section 300 set in the fifth period (t5).

Next, φ7 is set to the ON state potential for a prescribed time, and the reset potential input switch 402 is turned ON for a prescribed time. In this way, the reset potential holding capacitor 404 holds a signal corresponding to the signal potential.

During an eighth period (t8), φ2 is set to the ON state potential for a prescribed time, and the pixel reset switch 104 is turned ON for a prescribed time. As a result, the potential of the floating diffusion 103 is reset. The potential of the floating diffusion 103 changes from the signal potential to the reset potential. The change in potential of the floating diffusion 103 is communicated to the vertical signal line 200, via the pixel amplifier 105 and the selection switch 106. In this way, the pixel signal corresponding to the change from the signal potential to the reset potential of the floating diffusion 103 is input to the serial amplification amplifier section 300. The pixel signal input to the serial amplification amplifier section 300 is amplified by the second amplification ratio, which is determined according to the ratio between the capacitance of the input capacitor 301 and the capacitance of the second feedback capacitor 305, and the resulting second amplified signal is output from the serial amplification amplifier section 300.

The potential of the second amplified signal output from the serial amplification amplifier section 300 is expressed as Vout, when Vout expressed by the expression shown below is less than the power supply voltage of the serial amplification amplifier section 300. When Vout is greater than or equal to the power supply voltage of the serial amplification amplifier section 300, the potential of the second amplified signal output from the serial amplification amplifier section 300 is equal to the power supply voltage of the serial amplification amplifier section 300.

$V$out=VREF+(potential of the floating diffusion 103 after the transfer gate 102 is turned ON for a prescribed time−reset potential of the floating diffusion 103)×0.8×(−capacitance of the input capacitor 301/capacitance of the second feedback capacitor 305).

As an example, the capacitance of the input capacitor 301 is 1 pF, the capacitance of the second feedback capacitor 305 is 1 pF, the reset potential of the floating diffusion 103 is 4 V, the gain of the pixel amplifier 105 is 0.8 times, VREF is 2.0 V, and the power supply voltage of the serial amplification amplifier section 300 is 5 V. The potential of the floating diffusion 103 changes from the signal potential of 3 V to the reset potential of 3V. At this time, Vout=2.0V+(3V−4V)×0.8×(−1 pF/1 pF)=1.2 V, which is less than the 5 V power supply potential of the serial amplification amplifier section 300. Accordingly, in the example described above, the potential of the second amplified signal output from the serial amplification amplifier section 300 is 1.2 V.

Next, φ8 is set to the ON state potential for a prescribed time, and the signal potential input switch 403 is turned ON for a prescribed time. In this way, the signal potential holding capacitor 405 holds the second amplified signal corresponding to the reset potential.

During a ninth period (t9), φ9 is set to the ON state potential and the reset potential output switch 406 and signal potential output switch 407 are turned ON for a prescribed time. In this way, the signal corresponding to the signal potential held by the reset potential holding capacitor 404 in the seventh period (t7) and the second amplified signal corresponding to the reset potential held by the signal potential holding capacitor 405 in the eighth period (t8) are transmitted to the retrieval circuit 500. The control section 700 repeats the process from the third period (t3) to the ninth period (t9) to acquire the pixel signal from the pixel section 110.

As described above, the first amplified signal and the second amplified signal are retrieved by the retrieval circuit 500, according to the charge generated by inputting light to the photoelectric converter 101 in the second period (t2). In other words, the retrieval circuit 500 acquires the first amplified signal from the third period (t3) to the sixth period (t6). Then, the retrieval circuit 500 acquires the second amplified signal from the seventh period (t7) to the ninth period (t9). The first amplified signal and the second amplified signal are retrieved together with the signals corresponding respectively to the reset potential and the signal potential. Accordingly, the variation in the serial amplification amplifier section 300 can be cancelled out. For example, the difference between the first and second amplified signals and the reset and signal potentials can be used.

In the present example, the capacitance of the first feedback capacitor 303 differs from the capacitance of the second feedback capacitor 305, and therefore the first amplification ratio differs from the second amplification ratio. In other words, with a single exposure of the imaging unit 910, a signal corresponding to the first amplified signal and a signal corresponding to the second amplified signal are sent from the imaging unit 910 to the image processing section 912. The image processing section 912 combines the signal corresponding to the first amplified signal and the signal corresponding to the second amplified signal, which have different amplification ratios, to generate an image with an enlarged dynamic range.

More specifically, the first amplification ratio is greater than the second amplification ratio. In the present example, even if the first amplified signal is saturated by the power supply potential of the serial amplification amplifier section 300, since the second amplified signal has a lower amplification ratio than the first amplified signal, the second amplified signal is not saturated. Furthermore, the first retrieval is performed with the first amplification ratio that is greater than the second amplification ratio and the second retrieval is performed with the second amplification ratio that is smaller than the first amplification ratio, and therefore the effect of noise can be decreased. In other words, noise is caused due to injection of the carrier from the transistor when resetting the potential. Therefore, the signal with low intensity can be prevented from being affected by noise of the reset operation in the seventh period (t7).

Figure 5:
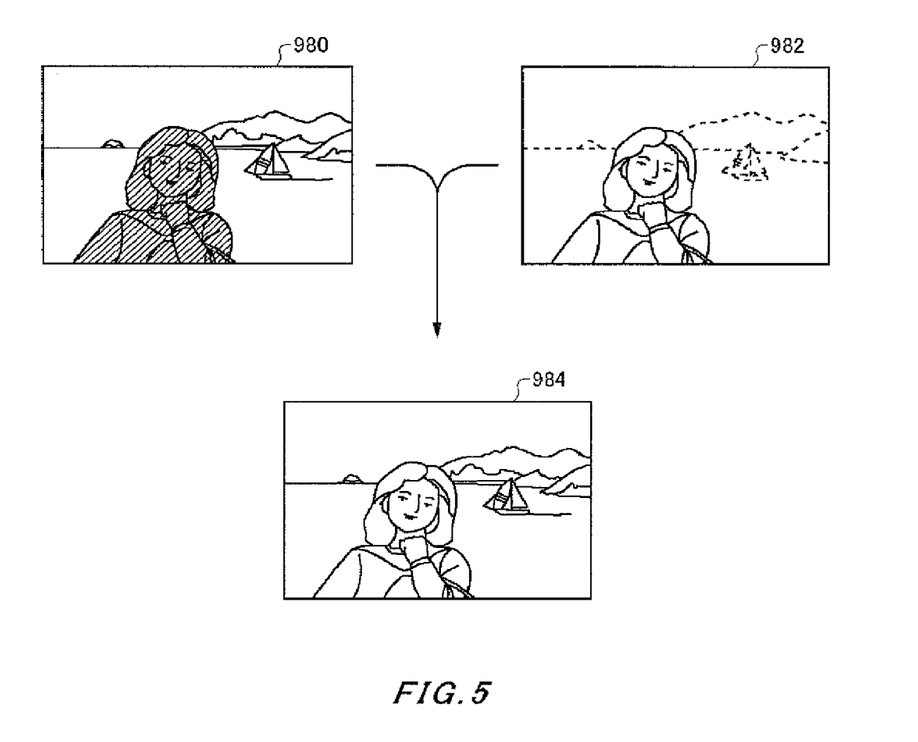
FIG. 5 is a view for describing the image processing of the imaging apparatus.

FIG. 5 is a view for describing the image processing of the imaging apparatus 900. When the imaging unit 910 is exposed and an image 982 is obtained from the first amplified signal that is amplified by the first amplification ratio, which is greater than the second amplification ratio, overexposure occurs in bright portions of the subject. On the other and, when the imaging unit 910 is exposed and an image 980 is obtained from the second amplified signal that is amplified by the second amplification ratio, which is less than the first amplification ratio, underexposure occurs in dark portions of the subject. For example, underexposure occurs in portions of the image 980 containing people, and portions of the people are blocked by shadow.

The image processing section 912 combines suitable portions of the image 982 and the image 980 to obtain an image 984 that does not contain overexposure, underexposure, or blocking shadows. For example, the image processing section 912 may generate an image using only the first amplified signal when the first amplified signal is not saturated. When generating an image using only the first amplified signal, the image processing section 912 may refrain from using the second amplified signal, or the control section 700 may refrain from causing the serial amplification amplifier section 300 to generate the second amplified signal. When the first amplified signal is saturated, the image 984 may be synthesized using the second amplified signal. Furthermore, the first amplified signal may be used in regions where the intensity of the second amplified signal is less than a prescribed level. In this way, an image with an increased dynamic range can be obtained.

As another example, the image processing section 912 may generate images one at a time, from each of the signal corresponding to the first amplified signal amplified with the first amplification ratio and the signal corresponding to the second amplified signal amplified with the second amplification ratio. In other words, the image processing section 912 may generate image data corresponding to the two images 982 and 980, and hold this image data in the camera memory 922. In this way, two images with different amplification ratios can be obtained with a single exposure.

Figure 6:
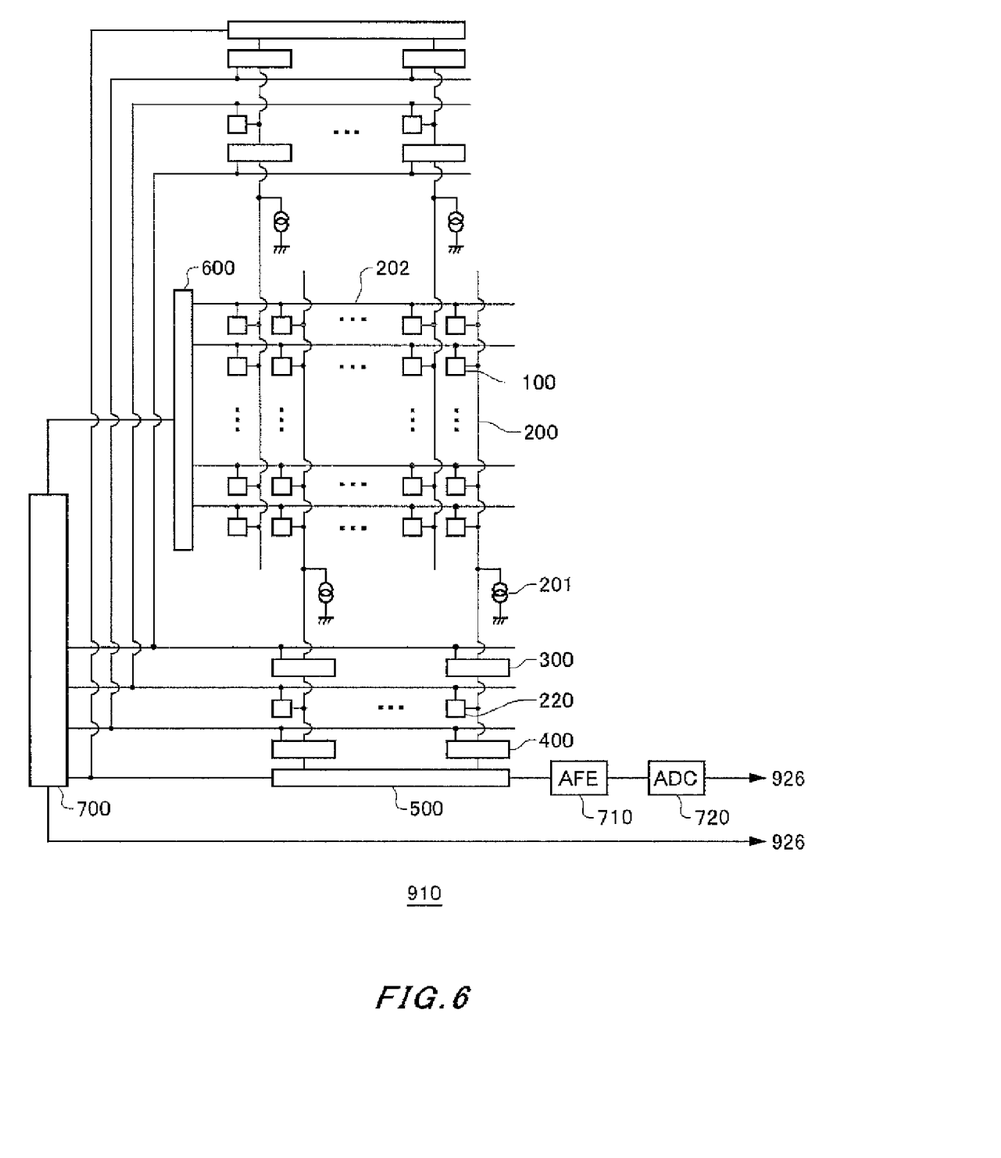
FIG. 6 is a view for describing another exemplary configuration of the imaging unit.

FIG. 6 is a view for describing another exemplary configuration of the imaging unit 910. The imaging unit 910 shown in FIG. 6 differs from the imaging unit 910 shown in FIG. 2 by including a determining section 220. The imaging unit 910 includes a pixel section 110, a negative current source 201, a serial amplification amplifier section 300, the determining section 220, a charge holding section 400, a retrieval circuit 500, a vertical scanning section 600, a control section 700, an AFE 710, and an ADC 720.

The determining section 220 is controlled by the control section 700 to compare an amplified signal output by the serial amplification amplifier section 300 to a signal with a prescribed level. The determining section 220 may include a comparator, for example. The result of the comparison by the determining section 220 is associated with the amplified signal output by the serial amplification amplifier section 300.

In the present example, the determining section 220 determines whether the amplified signal output from the serial amplification amplifier section 300 is in a saturated state. For example, if the first amplification ratio is greater than the second amplification ratio, the determining section 220 determines whether the first amplified signal amplified by the first amplification ratio is in a saturated state, and associates the result of this determination with at least one of the first amplified signal and the second amplified signal. For example, the first amplified signal and the second amplified signal may each include a state flag that indicates whether the first amplified signal is in a saturated state, in addition to an address of the single pixel 100 corresponding to each amplified signal and a signal corresponding to the intensity of the input light. The state flag indicating whether the first amplified signal is in a saturated state may be a 1-bit signal, for example.

The control section 700 may refrain from retrieving the second amplified signal when the state flag indicates that the first amplified signal, which is amplified with the first amplification ratio that is greater than the second amplification ratio, is not in a saturated state. In this way, the retrieval speed can be increased.

Figure 7:
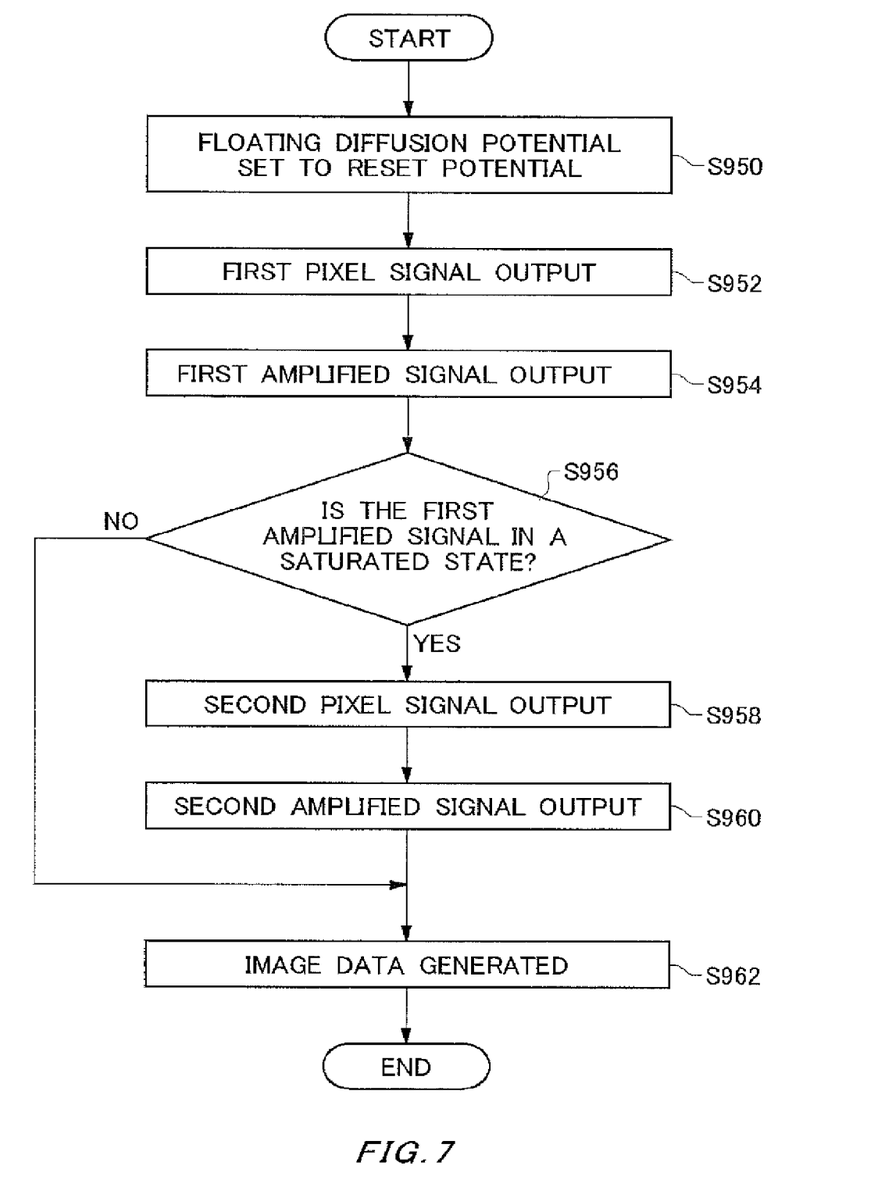
FIG. 7 shows a flow describing the image processing performed by the imaging apparatus.

FIG. 7 shows a flow describing the image processing performed by the imaging apparatus 900. The flow of FIG. 7 is an example of a flow corresponding to the imaging unit 910 shown in FIG. 6. The flow begins from a reset stage, prior to the exposure of the imaging unit 910, for example. At step S950, the control section 700 turns OFF the transfer gate 102 and turns ON the pixel reset switch 104. In this way, the potential of the floating diffusion 103 is reset to the reset potential. After this, the imaging unit 910 is exposed, and charge is generated according to the light incident to the photoelectric converter 101.

At step S952, the control section 700 turns OFF the pixel reset switch 104 and turns ON the transfer gate 102. In this way, the potential of the floating diffusion 103 becomes the signal potential after the charge accumulation. The control section 700 then causes the first pixel signal, which is a pixel signal corresponding to the change from the reset potential to the signal potential, to be output to the vertical signal line 200.

At step S954, the control section 700 causes the serial amplification amplifier section 300 to amplify the first pixel signal by the first amplification ratio, which is determined according to the capacitance ratio between the input capacitor 301 and the first feedback capacitor 303. The control section 700 then causes the serial amplification amplifier section 300 to output the first amplified signal, which is the first pixel signal amplified by the first amplification ratio.

At step S956, the control section 700 causes the determining section 220 to determine whether the first amplified signal is in a saturated state. If the state flag indicates that the first amplification signal is in a saturated state, the determining section 220 proceeds to step S956. If the state flag indicates that the first amplification signal is not in a saturated state, the determining section 220 proceeds to step S962. In the manner described above, the determining section 220 may associate the determination result with at least one of the first amplified signal and the second amplified signal.

At step S958, the control section 700 turns OFF the transfer gate 102 and again turns ON the pixel reset switch 104. In this way, the control section 700 sets the potential of the floating diffusion 103 to the reset potential, and causes the output of the second pixel signal, which is a pixel signal corresponding to the change from the signal potential to the reset potential.

At step S960, the control section 700 causes the serial amplification amplifier section 300 to amplify the second pixel signal with the second amplification ratio, which is determined according to the capacitance ratio between the input capacitor 301 and the second feedback capacitor 305. The control section 700 then causes the serial amplification amplifier section 300 to output the second amplified signal.

For example, the second amplified signal is output from the imaging unit 910 and replaces the first amplified signal output at step S954.

At step S962, the image processing section 912 generates an image from one or both of the first amplified signal and the second amplified signal output by the imaging unit 910 via the bus 926. For example, the image processing section 912 uses only a first pixel signal to generate image data corresponding to regions output by the first amplified signal that is not saturated. Furthermore, the image processing section 912 uses only the second amplified signal to generate image data of regions corresponding to the single pixel 100 output by the second amplified signal, for example. It should be noted that when there are regions whose image data is generated using the second amplified signal adjacent to regions whose image data is generated using the first amplified signal, the image processing section 912 may perform processing on the image data near the boundary between these regions to avoid an unnatural appearance near the boundary between the regions with different amplification ratios. For example, the image processing section 912 corrects the image data of the regions using the second amplified signal within a prescribed range from the boundary by making these regions brighter. The image processing section 912 may use the associated determination result of the determining section 220 for this processing.

The camera system control section 924 and the control section 700 finish this series of processing. A program held in the camera memory 922 can cause the camera system control section 924 and the control section 700 to perform the series of processing described above.

The above describes an example in which the second amplified signal that the control section 700 causes the serial amplification amplifier section 300 to output at step S960 replaces the first amplified signal output at step S954, but the present invention is not limited to this, and the imaging unit 910 may output both the first amplified signal output at step S954 and the second amplified signal output at step S960. In this case, the image processing section 912 may generate one image by using both the first amplified signal and the second amplified signal.

The above describes an example referred to as a 4Tr pixel configuration, in which one photoelectric converter 101 includes one each of the floating diffusion 103, the pixel reset switch 104, the pixel amplifier 105, and the selection switch 106, but the present invention is not limited to a 4Tr pixel configuration, and the same effect can be achieved with an imaging unit 910 in which the floating diffusion 103, the pixel reset switch 104, the pixel amplifier 105, and the selection switch 106 are shared by a plurality of photoelectric converters 101. Furthermore, another charge holding section 400 may be included. In this way, the time needed to retrieve signals can be decreased.

The above describes an example in which the charge holding section 400 is connected to the serial amplification amplifier section 300, but the present invention is not limited to this, and the same operation can be realized by an imaging unit 910 that includes the ADC 720 downstream from the serial amplification amplifier section 300, for example. In this case, the ADC 720 connected to the serial amplification amplifier section 300 converts the signal received from the serial amplification amplifier section 300 into a digital signal, and outputs this digital signal to the charge holding section 400. The charge holding section 400 transmits the digital signal to the retrieval circuit 500 at a timing controlled by the control section 700. The imaging unit 910 includes a DFE (Digital Front End) and the retrieval circuit 500 transmits the signal to the DFE. The DFE combines the levels of the received signals and outputs the result to the bus 926.

The above describes an example in which the first amplification ratio and the second amplification ratio are predetermined amplification ratios, but the present invention is not limited to this, and the first amplification ratio and second amplification ratio may be selected and set from among a plurality of amplification ratios. For example, the first amplification ratio and the second amplification ratio may be selected from among an amplification ratio determined according to the ratio between the input capacitor 301 and the first feedback capacitor 303, an amplification ratio determined according to the ratio between the input capacitor 301 and the second feedback capacitor 305, and an amplification ratio determined according to the ratio between input capacitor 301 and the first feedback capacitor 303 and second feedback capacitor 305 connected in parallel.

As another example, three or more sets of a feedback capacitor selection switch and a feedback capacitor may be arranged in parallel in the feedback loop of the serial amplification amplifier section 300. The three or more sets of a feedback capacitor selection switch and a feedback capacitor may be provided independently or in combination to correspond to different amplification ratios. The different amplification ratios may correspond to different ISO sensitivities.

The control section 700 may set an amplification ratio corresponding to a user-designated ISO sensitivity received by the receiving section 914 as one of the first amplification ratio and the second amplification ratio. The control section 700 may set the other of the first amplification ratio and the second amplification ratio to be an amplification ratio corresponding to an ISO sensitivity calculated by the camera system control section 924 from detection results of the AE sensor 916. At this time, the amplification ratio corresponding to the ISO sensitivity may be calculated by the camera system control section 924 and transmitted to the control section 700. The control section 700 may select one or more of the plurality of feedback capacitors of the serial amplification amplifier section 300 according to the amplification ratio sent from the camera system control section 924, to set the first amplification ratio or second amplification ratio.

As another example, the receiving section 914 may receive two ISO sensitivity selections from the user, and amplification ratios corresponding to the two ISO sensitivities received by the receiving section 914 may be sent to the control section 700. In this case as well, the control section 700 may set the first amplification ratio and the second amplification ratio.

While the embodiments of the present invention have been described, the technical scope of the invention is not limited to the above described embodiments. For example, the imaging apparatus 900 may be used as a detecting section that feeds back the output of the imaging unit 910 and detects brightness. Furthermore, the image processing by the imaging unit imaging apparatus 900 is not limited to the example shown in FIG. 7, and the imaging unit 910 shown in FIG. 2 or 6 may output respective signals based on the first amplified signal and the second amplified signal, and the image processing section 912 may generate one or two images. In a case where the imaging unit 910 shown in FIG. 6 outputs respective signals based on the first amplified signal and the second amplified signal, the image processing section 912 may generate a single image using the determination results of the determining section associated with at least one of the first amplified signal and the second amplified signal.

The above describes examples in which the imaging unit 910 includes a CMOS sensor, but the present invention is not limited to this, and may also be applicable to an imaging unit 910 including a CCD sensor. In the case of an imaging unit 910 including a CCD sensor, for example, a configuration can be used in which the signal charge transmitted by the shift register of the CCD is converted into voltage using a floating diffusion amplifier. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

100: single pixel, 101: photoelectric converter, 102: transfer gate, 103: floating diffusion, 104: pixel reset switch, 105: pixel amplifier, 106: selection switch, 110: pixel section, 200: vertical signal line, 201: negative current source, 202: control line, 220: 220 serial amplification amplifier section 300: serial amplification amplifier section, 301: input capacitor, 302: serial amplification assembly switch, 303: first feedback capacitor, 304: first feedback capacitor selection switch, 305: second feedback capacitor, 306: second feedback capacitor selection switch, 308: amplifier, 400: charge holding section, 402; reset potential input switch, 403; signal potential input switch, 404: reset potential holding capacitor, 405: signal potential holding capacitor, 406: reset potential output switch, 407: signal potential output switch, 500: retrieval circuit, 600: vertical scanning section, 700: control section, 710: AFE, 720: ADC, 900: imaging apparatus, 910: imaging unit, 912: image processing section, 914: receiving section, 916: AE sensor, 918: work memory, 920: display section, 922: camera memory, 924: camera system control section, 926: bus

What is claimed is:

1. An imaging apparatus comprising:
   an imaging unit comprising
      a pixel section that outputs a pixel signal corresponding to a reset potential after a reset and a signal potential after charge accumulation,
      an amplifying section that amplifies the pixel signal with a first amplification ratio or a second amplification ratio that is different from the first amplification ratio, and
      a control section that causes the amplifying section to amplify the pixel signal corresponding to a change from the reset potential to the signal potential with the first amplification ratio, and then causes the amplifying section to amplify the pixel signal corresponding to a change from the signal potential to the reset potential with the second amplification ratio;
   an image processing section that generates image data by acquiring a plurality of the pixel signals amplified by the amplifying section;
   a receiving section that receives a selection of ISO sensitivity from a user, wherein
   the control section sets an amplification ratio corresponding to the ISO sensitivity received by the receiving section as one of the first amplification ratio and the second amplification ratio; and
   a detecting section that detects brightness of a subject, wherein
   the control section sets an amplification ratio based on a detection result of the detecting section as the other of the first amplification ratio and the second amplification ratio.

2. The imaging apparatus according to claim 1, wherein the pixel section includes:
   a photoelectric converter;
   a transfer gate that transfers charge generated by the photoelectric converter to a floating diffusion; and
   a pixel reset switch that eliminates the charge accumulated in the floating diffusion and resets a potential of the floating diffusion from the signal potential to the reset potential.

3. The imaging apparatus according to claim 1, wherein the first amplification ratio is greater than the second amplification ratio.

4. The imaging apparatus according to claim 3, wherein in a case where the pixel signal amplified with the first amplification ratio by the amplifying section is not saturated, the control section does not amplify the pixel signal with the second amplification ratio.

5. The imaging apparatus according to claim 1, the imaging unit further comprising
   a determining section that determines whether the pixel signal amplified by the amplifying section is in a saturated state, wherein
   the control section associates a determination result made by the determining section with at least one of the pixel signal amplified with the first amplification ratio and the pixel signal amplified with the second amplification ratio.

6. The imaging apparatus according to claim 1, wherein the amplifying section includes:
   a first circuit that determines the first amplification ratio;
   a second circuit that is arranged in parallel with the first circuit and determines the second amplification ratio; and
   a reset circuit that is arranged in parallel with the first circuit and the second circuit and includes a reset switch for resetting the amplifying section, and
   the control section selects the first circuit or the second circuit while the reset switch is in an ON state, and then turns OFF the reset switch.

7. The imaging apparatus according to claim 2, wherein the control section sets the potential of the floating diffusion to the reset potential by turning OFF the transfer gate and turning ON the pixel reset switch, then sets the potential of the floating diffusion to the signal potential by turning OFF the pixel reset switch and turning ON the transfer gate for a predetermined time and then turning OFF the transfer gate, thereby causing the pixel section to output the pixel signal corresponding to the change from the reset potential to the signal potential, and further sets the potential of the floating diffusion to the reset potential by again turning ON the pixel reset switch, thereby causing the pixel section to output the pixel signal corresponding to the change from the signal potential to the reset potential.

8. The imaging apparatus according to claim 1, wherein in a case where the pixel signal amplified with the first amplification ratio is saturated, the image processing section replaces the pixel signal amplified with the first amplification ratio with the pixel signal amplified with the second amplification ratio, and generates image data corresponding to one image.

9. The imaging apparatus according to claim 1, wherein the image processing section generates image data including one image for each of the pixel signal amplified with the first amplification ratio and the pixel signal amplified with the second amplification ratio.

* * * * *